United States Patent [19]

Higashi et al.

[11] Patent Number: 4,761,693
[45] Date of Patent: Aug. 2, 1988

[54] MAGNETIC RECORDING AND REPRODUCING DEVICE

[75] Inventors: Hidejiro Higashi; Hiroshi Sato; Kaoru Yamamoto; Jun Kanda, all of Saitama, Japan

[73] Assignee: Pioneer Electronic Corporation, Tokyo, Japan

[21] Appl. No.: 16,619

[22] Filed: Feb. 19, 1987

[30] Foreign Application Priority Data

Feb. 19, 1986 [JP] Japan ................................. 61-34160
Feb. 19, 1986 [JP] Japan ................................. 61-34161
Feb. 19, 1986 [JP] Japan ................................. 61-34162

[51] Int. Cl.$^4$ .................... G11B 27/02; G11B 15/14
[52] U.S. Cl. .................................... 360/13; 360/64
[58] Field of Search ................ 360/13, 14.1, 64, 8, 360/32

[56] References Cited

U.S. PATENT DOCUMENTS

4,507,688 3/1985 Fuijki et al. ............................ 360/13
4,701,812 10/1987 Tanaka et al. ........................ 360/13

Primary Examiner—Vincent P. Canney
Attorney, Agent, or Firm—Sughrue, Mion, Zinn, Macpeak & Seas

[57] ABSTRACT

A magnetic recording and reproducing method and device using a rotary head with two reproducing heads and two corresponding recording heads whereby slanted tracks are formed on the tape, each consisting of several sequential recording tracks. The reproducing heads are arranged to precede the corresponding recording heads by at least three fields (slanted track) so that a new audio signal can be input at the same time as the output of the audio signal from a given recording track and then recorded in that given track.

6 Claims, 8 Drawing Sheets

MAGNETIC RECORDING AND REPRODUCING DEVICE

BACKGROUND OF THE INVENTION

1. Field of the Invention

This invention relates to a magnetic recording and reproducing device such as a so-called 8-mm video tape recorder.

2. Background of the Invention

Figure 8:
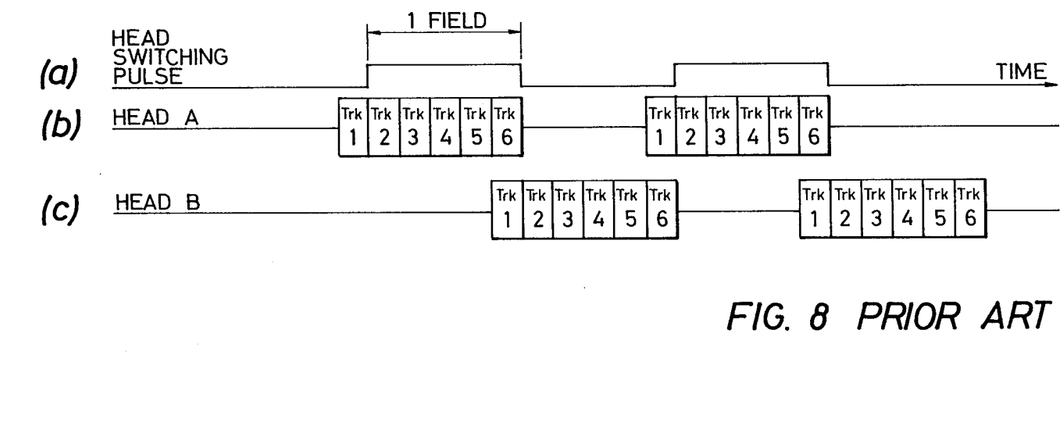
FIG. 8 is a time chart for a description of the operation of a conventional multi-track 8-mm video tape recorder.

In 8-mm video tape recorders which have been standardized recently and are commercially available, a magnetic tape is wound on a rotary drum through 221°. Each of several sloped tracks is divided into a video signal recording region corresponding to a winding angle of 180° (one field) and a PCM audio signal recording region corresponding to a winding angle of 36°. As a result, both video signals and PCM audio signals can be recorded and reproduced. Furthermore, the video signal recording region is divided into five tracks each corresponding to a winding angle of 36° so that six tracks in total are used for recording and reproducing PCM audio signals. In this case, the relation in phase between a head switching pulse (HSWP) for switching a pair of rotary heads A and B which are diametrically opposite to each other and different in azimuth from each other and the tracks (Trk1 through Trk6) is as shown in FIG. 8.

Similarly as in an ordinary ½-inch video tape recorder, the conventional 8-mm video tape recorder is used to record and reproduce both video signals and audio signals. Therefore, it is designed with preference given to recording video signals. Therefore, in many of the conventional 8-mm video tape recorders, the recording rotary head is used also as the reproducing rotary head. Also, therefore, a PCM audio signal cannot be after-recorded in synchronization with the PCM audio signal recorded in a predetermined track.

In some of the conventional 8-mm video tape recorders, the recording rotary head and the reproducing rotary head are separately provided. However, they are so arranged that the recording rotary head precedes the reproducing rotary head, for emphasizing the monitoring function. Although they are intended to permit an after-recording operation, the amount of precedence of the reproducing rotary head with respect to the recording rotary head is insufficient because they handle video signals. Thus, in the multiple tracks of the 8-mm video tape recorder, a PCM audio signal cannot be recorded in synchronization with the PCM audio signal recorded in a desired one of the tracks.

SUMMARY OF THE INVENTION

Accordingly, an object of this invention is to eliminate the above-described difficulties accompanying a conventional 8-mm video tape recorder.

The foregoing object and other objects of the invention have been achieved by the provision of a magnetic recording and reproducing device in which digital signals are recorded on a plurality of tracks obtained by dividing each of a plurality of parallel inclined tracks. The digital signals are reproduced therefrom by rotary heads. In the magnetic recording and reproducing device according to the invention, recording rotary heads and reproducing rotary heads are so arranged that the reproducing rotary heads precede the recording rotary heads by at least three fields. A desired one of the plurality of tracks is selected. The digital signal of the track thus selected is reproduced with the reproducing rotary head and outputted as an analog signal through time axis expansion. A new analog signal is inputted in synchronization with the analog signal thus outputted and is converted into a digital signal which is subjected to time axis compression. The digital signal thus newly inputted is recorded with the recording rotary head on a track including the track selected in synchronization with at least a part of the digital signal recorded on the track selected.

In the magnetic recording and reproducing device of the invention, a desired one of the plurality of tracks is selected and the digital signal of the track thus selected is reproduced with the reproducing rotary head. The digital signal is subjected to time axis expansion. That is, in correspondence to the compression, it is expanded from a length corresponding to about one track to a length corresponding to one field so that it is outputted as an analog signal. In synchronization with the analog signal thus outputted, an analog signal to be after-recorded is inputted and converted into a digital signal. The digital signal is subjected to time axis compression. That is, it is compressed to a length corresponding to about one track from the length corresponding to one field (five tracks). The digital signal thus processed is applied to the recording rotary head. The recording rotary head comes after the reproducing rotary head by at least three fields. Therefore, the selected track is confronted with the recording rotary head after a period of time corresponding to three fields after being traced (for reproduction) by the reproducing rotary head. Hence, the new digital signal inputted can be recorded with the recording rotary head in synchronization with at least a part of the digital signal recorded in the track selected.

The nature, principle and utility of the invention will become more apparent from the following detailed description when read in conjunction with the accompanying drawings.

DETAILED DESCRIPTION OF THE INVENTION

One embodiment of this invention will be described with reference to the accompanying drawings.

Figure 1:
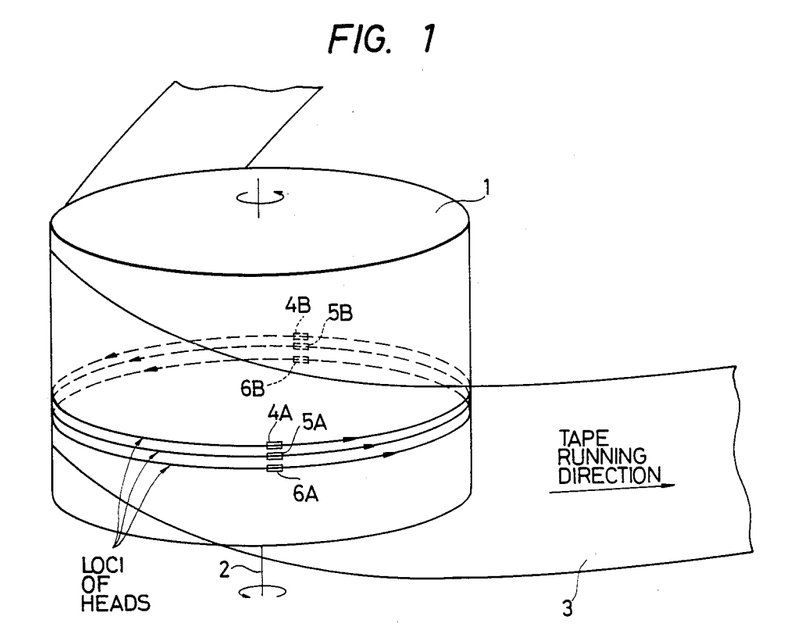
FIG. 1 is a perspective view showing one example of the arrangement of the rotary heads in a magnetic recording and reproducing device according to this invention.
Figure 4:
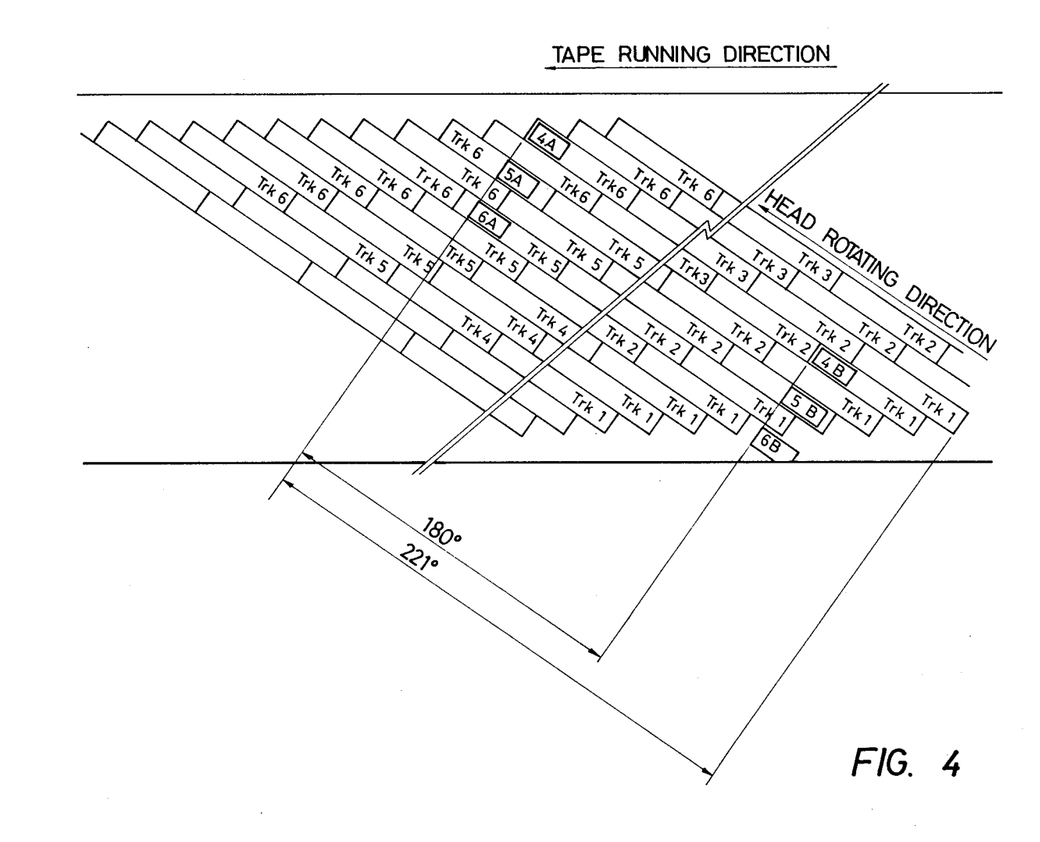
FIG. 4 is an explanatory diagram showing tracks on a magnetic tape in the device of the invention.

FIG. 1 shows the rotary drum 1 of a magnetic recording and reproducing device according to the invention. As shown in FIG. 1, a magnetic tape 3 is wound on the rotary drum 1 through about 221°. The rotary drum 1 is rotated around its rotational axis in such a manner that the magnetic tape 3 is sloped at a predetermined lead angle. The rotary drum 2 has a pair of reproducing rotary heads 4A and 4B, a pair of erasing rotary heads 5A and 5B, and a pair of recording heads 6A and 6B, which are respectively disposed on different lines and in different planes. The reproducing rotary heads 4A and 4B precede the erasing rotary heads 5A and 5B respectively by two fields in phase, which in turn precede the recording rotary heads 6A and 6B by two fields in phase, respectively. The signal recorded on a track by the recording rotary head 6A is reproduced by the reproducing rotary head 4A at the same azimuth, and can be erased by the erasing rotary head 5A. Similarly, the signal recorded on a track by the recording rotary head 6B is reproduced by the reproducing rotary head 4B, and erased by the erasing rotary head 5B. Each pair of rotary heads (A and B) are diametrically opposite to each other (or spaced 180° from each other) and at the same level (height). Therefore, the relations between the rotary heads 4A through 6B and the tracks are as shown in FIG. 4.

Figure 2:
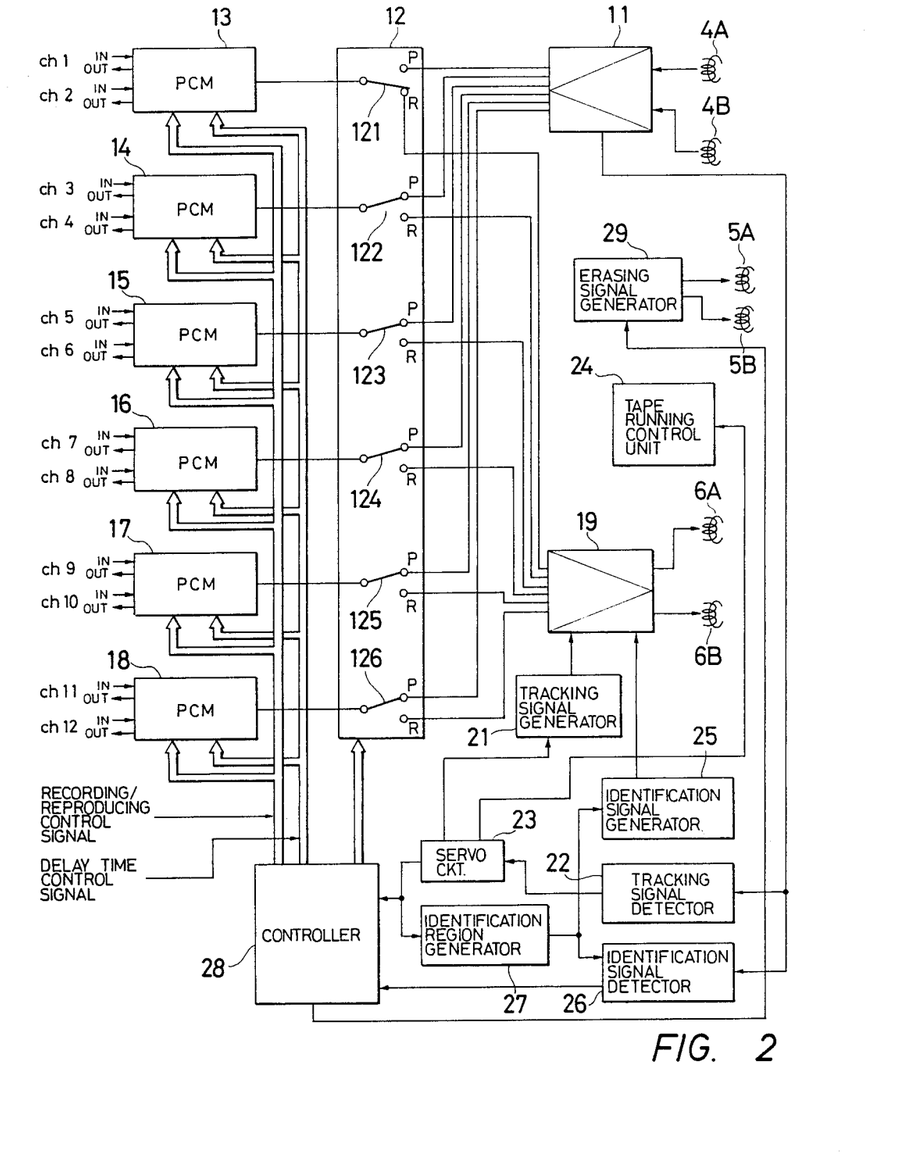
FIG. 2 is a block diagram of the magnetic recording and reproducing device according to the invention.

FIG. 2 is a block diagram of the magnetic recording and reproducing device according to the invention. Four pilot (tracking) signals of different frequencies are outputted by a tracking signal generator 21 and are recorded in tracks on the tape 3 through a recording amplifier 19 and the recording rotary heads 6A and 6B. The tracking signals are detected by a tracking signal detector 22 from the signal which is reproduced through the reproducing rotary heads 4A and 4B and a reproducing amplifier 11. Upon detection of the tracking signal, the tracking signal detector 22 applies a detection signal to a servo circuit 23. In response to the detection signal, the servo circuit 23 controls a tape running control unit 24 including pinch rollers (not shown) etc. thereby to control the speed of movement of the magnetic tape 3. Thus, the tracking control is so carried out that the sloped tracks are accurately traced by the rotary heads 4A through 6B.

An identification signal outputted by an identification signal generator 25 is recorded on each track. The identification signal is detected by an identification signal detector 26. The servo circuit 23 produces a head switching pulse for switching each pair of rotary heads (A and B) according to the rotational angles of the rotary drum 1 (and accordingly the angles of the rotary heads 4A through 6B). The servo circuit 23 applies the head switching pulse to an identification region generator 27 and to a controller 28 including a CPU (central processing unit). The identification region generator 27, operated manually or automatically, applies a track selection signal for selecting a desired one of six tracks Trk1 through Trk6 to the identification signal generator 25 and the identification signal detector 26. The identification signal generator 25 produces a predetermined identification signal for every region (track) corresponding to the selecting signal thus outputted. The identification signal detector 26 detects the identification signal of the track corresponding to the track selection signal and applied a detection signal to the controller 28. In response to the detection signal, the controller 28 selectively activates processing circuits 13 through 18 and switches 121 through 126 in a switch circuit 12. As a result, reproducing signals outputted by the reproducing rotary heads 4A and 4B are applied through the reproducing amplifier 11 to the switches 121 through 126 and to predetermined ones of the processing circuits 13 through 18 so that they are outputted as two-channel signals, for instance right and left stereo audio signals. The two-channel signals are supplied to the recording amplifier 19 through the predetermined ones of the processing circuits 13 through 18 and of the switches 121 through 126 and are recorded on a track selected by the recording rotary heads 6A and 6B.

Figure 3:
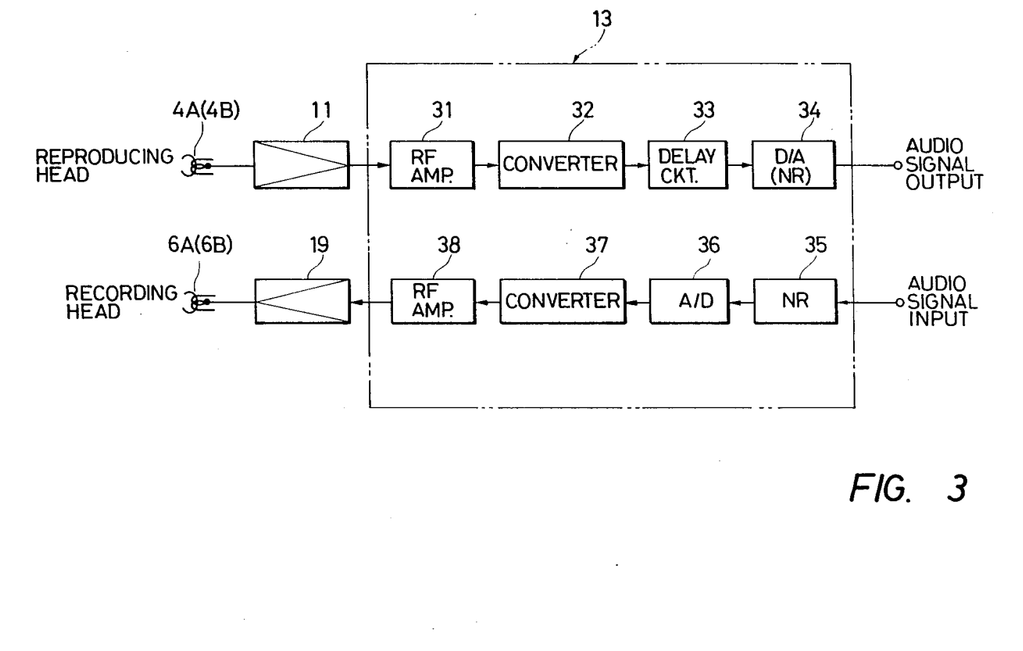
FIG. 3 is a block diagram showing a processing circuit in the device of the invention.

Each of the six processing circuits 13 through 18 provided respectively for the six tracks is arranged as shown in FIG. 3 (for simplification, only the processing circuit 13 is illustrated). A reproducing digital signal outputted by the reproducing amplifier 11 is amplified by an RF amplifier 3 and is applied to a converter circuit 32 which operates to convert 8-bit data into 10-bit data according to a predetermined conversion table. The converter circuit 32 also conducts a time axis expanding operation to change data corresponding to one track in length into those corresponding to one field in length. The output signal of the converter circuit 32 is delayed a predetermined period of time by a delay circuit 33 which is controlled by the controller 28 and is applied to a digital-to-analog (A/D) conversion circuit 34 including a noise reduction (NR) circuit. The A/D conversion circuit 34 operates to convert the received digital signal into an analog signal and to make the levels of the high frequency components of the analog signal lower than those of the low frequency components to thereby output an ordinary analog audio signal.

On the other hand, an analog audio signal to be recorded is supplied to a noise reduction (NR) circuit 35, where the levels of the high frequency components are emphasized when compared with those of the low frequency components. The analog signal outputted by the noise reduction circuit 35 is converted into a digital signal by an analog-o-digital (A/D) conversion circuit 36 and the digital signal is applied to a converter circuit 37. The converter circuit 37 operates to compress data corresponding to one field in time length into data corresponding to about one track (=1/5 field) in time length and to convert 10-bit data into 8-bit data. The output of the converter circuit 37, after being amplified by an RF amplifier 38, is applied to the recording amplifier 19.

Figure 5:
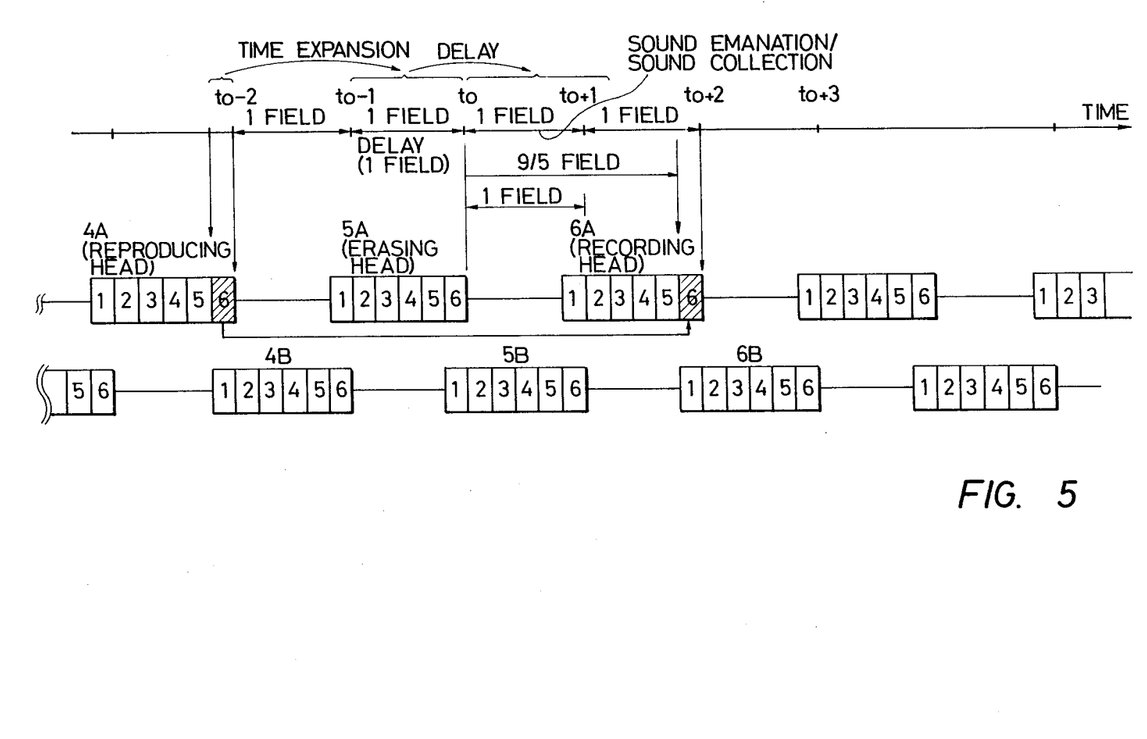
FIGS. 5, 6 and 9 are time charts for a description of the operation of the device according to the invention.

FIG. 5 is a time chart for a description of the after-recording operation of the magnetic recording and reproducing device of the invention.

It is assumed that, of the tracks Trk1 through Trk6, the track Trk6 is selected, that the signal recorded on the track Trk6 is reproduced (as sound) at the time instant $t_o$, and that in synchronization with the analog audio signal thus reproduced, a new audio signal is captured to be recorded.

The signal reproduced at the time instant $t_o$ has its time axis expanded by a period of time corresponding to one field by the converter circuit 32. This time expansion is made before the audio reproduction. The delay time of the delay circuit 33 is set to a value corresponding, in this case, to one field by the controller 28. Accordingly, the signal reproduced at the time instant $t_o-2$, is the signal which is outputted as a result of the tracing (reproduction) which was accomplished by the reproducing rotary head 4A at the time instant $t_o-2$, which is earlier by two fields than the time instant $t_o$. As was described before, the reproducing rotary head 4A precedes the erasing rotary head 5A by two fields. Therefore, the erasing rotary head 5A traces the track Trk6 at the time instant $t_o+2$ when a period of time corresponding to two fields has passed since the reproducing rotary head 4A traced the track Trk6. In this operation, the controller 28 operates the erasing signal generator 29 so that an erasing signal is supplied to the rotary head 5A to erase the signal from the selected track Trk6.

On the other hand, a new analog audio signal to be after-recorded may be inputted to the processing circuit 18 in synchronization with the analog audio signal which is reproduced as sound at the time instant $t_o$ (for instance, while listening to the audio signal). In this case, the analog signal is converted into a digital signal by the A/D conversion circuit 36, and the signal corresponding to one field which is inputted for the period of time $t_o - t_o + 1$ is subjected to time axis compression, i.e., it is compressed into a signal corresponding to about one track (1/5 field). Since this signal processing needs a period of time corresponding to about 4/5 field, the input signal is recorded on the track which comes immediately when a period of time corresponding to 9/5 fields has passed after the inputting of the signal. When the period of time corresponding to 9/5 fields has passed from the time instant $t_o$, the recording rotary head 6A is placed on the track Trk6 which has been traced by the reproducing rotary head 4A. Therefore, the new audio signal is after-recorded on the same track Trk6 in synchronization with the old audio signal which had been recorded in that track. Therefore, by inputting at least a part of the audio signal which has been recorded, for instance, in the eleventh and twelfth channels, the signal recorded in the eleventh channel, together with the new signal can be processed by the processing circuit 18. Then, the original signal can again be recorded in the eleventh channel while the new signal can be recorded in the twelfth channel. Therefore, when the track Trk6 is subjected to signal reproduction, then the original signal of the eleventh channel and the new signal of the twelfth channel can be reproduced at the same time.

The signals of two channels are recorded on one and the same track. Therefore, it is impossible to erase the signal of only one of the two channels. Therefore, when it is required to after-record a signal in one channel with the signal in the other channel maintained unchanged, the signal of the other channel obtained from the reproducing signal is stored in memory means such as a RAM or shift register once, and then read out for recording it.

Figure 6:
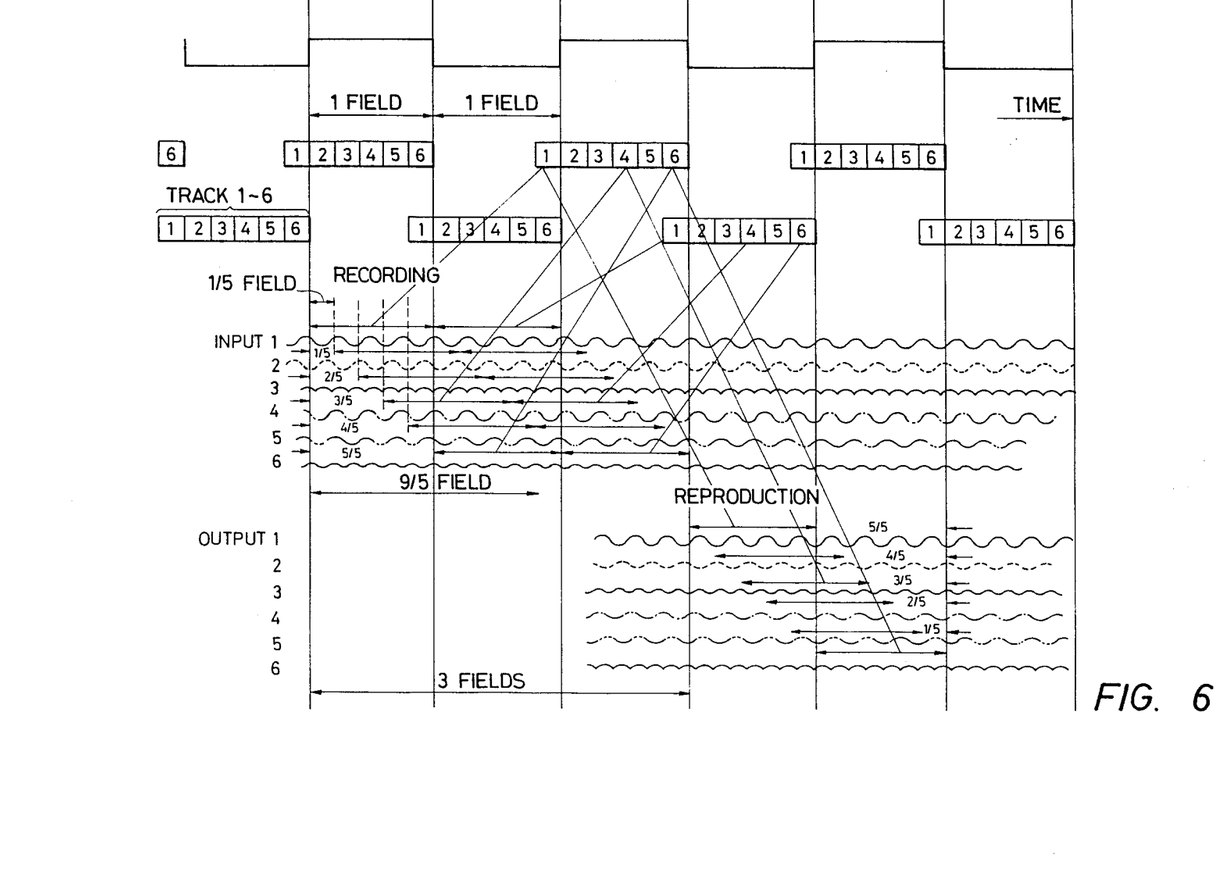

As was described above, the input signal for one field, being subjected to time axis compression, is recorded on the track corresponding to 1/5 field which comes immediately after a period of time corresponding to 9/5 fields has passed from the inputting of the signal. The reproducing signal obtained from the track is reproduced as sound when a period of time corresponding to one field has passed from the time instant when the track was traced. This will become more apparent from FIG. 6. As is clear from FIG. 6, in order to allow the recording rotary head to after-record a signal on the track which has been traced by the reproducing rotary head, the reproducing rotary head should precede the recording rotary head by at least three fields. However, in the above-described embodiment, the reproducing rotary head precedes the recording rotary head by four fields which is larger by one field than the required three field. Also, the reproducing signal is delayed as much by the delay circuit 33 (which permits the arrangement of the delay circuit at the rear stage of the converter circuit 32) because of following four reasons.

First Reason

A signal can be after-recorded on a track different from the track traced by the reproducing rotary head (being in one and the same sloped track). That is, for instance in the case where the reproducing signal obtained from a track Trk6 is to be recorded on the track Trk6, the delay time of the delay circuit 33 is set to a value corresponding to one (=5/5) field, and therefore when it is required to record the signal on the track Trk5, the delay time is set to a value corresponding to 4/5 field, and when it is required to record the signal on the track Trk4, the delay time is set to a value corresponding to 3/5 fields, and when it is required to record the signal to track Trk3, the delay time is set to a value corresponding to 2/5 field, and so forth (cf. FIG. 6). In this case, the controller 28 changes the delay time of the delay circuit 33 according to the output signal of the identification region generator 27. Thus, the reproducing signal obtained from a track which should be subjected to after-recording can be reproduced as sound during a period of time corresponding to 9/5 fields before the track confronts the recording rotary head.

Second Reason

The reproducing signals obtained from more than one track can be reproduced at the same time. For instance in the case where the reproducing signals obtained from six tracks are reproduced simultaneously, the delay time of the reproducing signal from the track Trk1 is set to a value corresponding to 5/5 field, and the delay time of the reproducing signal from the Trk2 is set to a value corresponding to 4/5 field, the delay time of the reproducing signal from the track Trk3 is set to a value corresponding to 3/5 field, and so forth (cf. FIG. 6). In the case where, for instance, the reproducing signals from the tracks Trk2 and Trk5 are reproduced into sound, a method may be employed in which the reproducing signal from the track Trk2 is delayed by a period of time corresponding to 4/5 field while the reproducing signal from the track Trk5 is delayed by a period of time corresponding to 1/5 field so that there is a time delay corresponding to 3/5 field between these reproducing signals. Alternatively, a method may be employed in which, with the track Trk5 as a reference, the reproducing signal from the track Trk5 is delayed by a period of time corresponding to 0 field (i.e., it is not delayed at all) while the reproducing signal from the track Trk2 is delayed by a period of time corresponding to 3/5 field. In the former method, the track Trk6 is employed as a reference at all times to determined delay times for the reproducing signals, and therefore the delay times given to the reproducing signals are the same at all times. On the other hand, in the latter method, the delay times must be changed according to the track selected. In the case where the reproducing signals obtained from a first track and a second track are reproduced simultaneously, as was described above, memory means such as a RAM or shift register as the delay circuit 33 so that the signal which is reproduced first is stored, and is read out in a predetermined period of time. The delay circuit 33 may be formed by delaying the time axis expansion of the converter circuit 32 by a predetermined period of time.

Third Reason

Even in the case where the magnetic tape is run at a speed different from the standard speed, the after-recording can be achieved. For instance in the case where the magnetic tape running speed is set to half (½) of the standard speed, that is, a long recording (LP) mode is selected, the track pitch is half of that in a standard recording (SP) mode. Therefore the amount of precedence of the reproducing rotary head 4A over the recording rotary head 6A is doubled (eight (8) fields). Therefore, in the long recording mode, the delay time of the delay circuit 33 should be set to 5 (=8=3) fields.

Fourth Reason

Even when the time axis expansion and compression times of the converter circuits 32 and 37 are changed, for instance decreased, merely by adjusting the delay time, the after-recording can be performed without changing the arrangement of the rotary heads.

Figure 9:
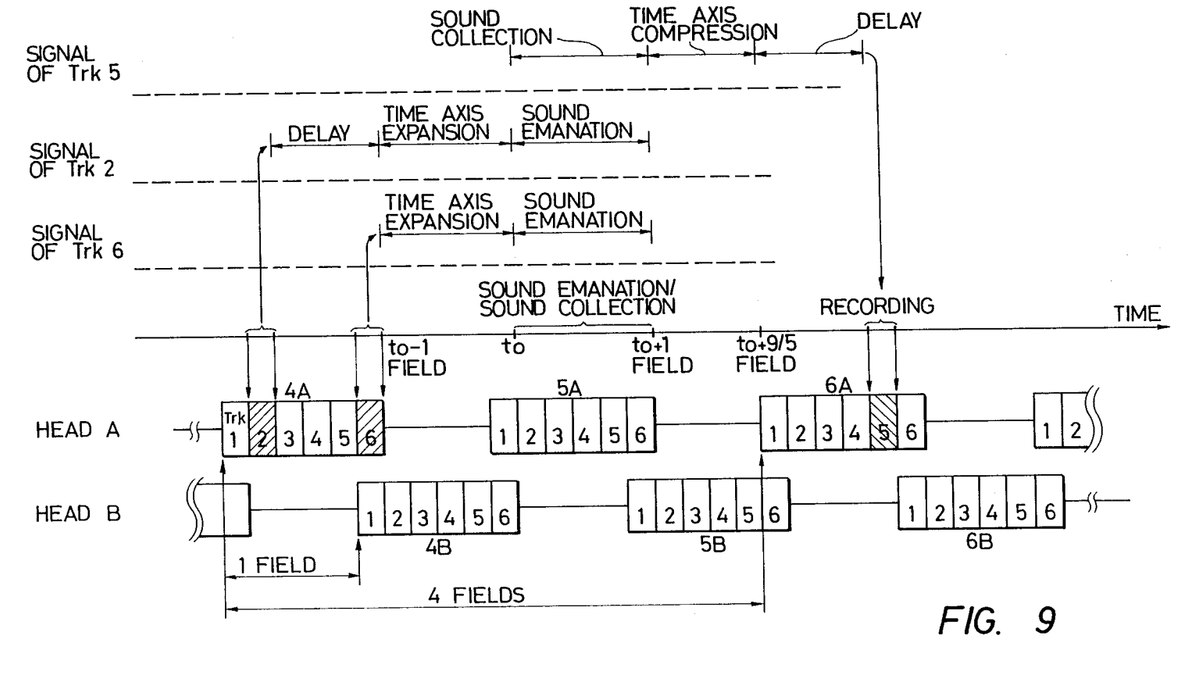

In the case where the signals of a plurality of tracks are reproduced as sound simultaneously, a new signal can be recorded on a predetermined track in synchronization with the reproduction of the signals. FIG. 9 is a time chart for a description of this method. In the case of FIG. 9, the reproducing signal obtained from the track Trk2 is delayed by a period of time corresponding to 4/5 field while the reproducing signal obtained from the track Trk6 is not delayed so that the reproducing signals are reproduced simultaneously, and a new signal is recorded on the track Trk5 in synchronization with the reproduction of these signals.

In the case where the track Trk1 is selected and a signal is recorded on the track Trk1 or the signal of the track Trk1 is reproduced, the phase of a head switching pulse, for switching the recording (or reproducing) rotary heads A and B with respect to the tracks, is as shown in FIG. 8. When track Trk2 is selected, the phase of the head switching pulse is shifted by one track to the right in FIG. 8, and when the track Trk3 is selected, the phase of the pulse is further shifted by one track, and so on. However, sometimes the track selected by the recording rotary head is different from that selected by the reproducing rotary head. In this case, for instance for the preceding reproducing rotary head, the phase of the head switching pulse coincides with the track selected as described above, and the head switching pulse is delayed (phase-shifted) in correspondence to the track selected by the recording rotary head so as to form a false switching pulse (or track selecting pulse) for the recording rotary head (or vice versa). In the case also where two tracks are selected and the signals of their two tracks are reproduced simultaneously, the phase of the head switching pulse coincides with one of the tracks (for instance the preceding one), and the head switching pulse is utilized to form a track selecting pulse for selecting the other track.

Depending on the arrangement, the rotary heads 4A, 5A and 6A (or 4B, 5B and 6B) sometimes are not positioned to confront the respective tracks at one and the same time. For instance in the case where the tracks are formed in each sloped track as shown in FIG. 4, when the rotary head 4A has completed the tracing of the track Trk6 in a predetermined sloped track, the rotary head 5A is still tracing the track Trk6 in the sloped track two tracks away and the rotary head 6A is tracing the track Trk5 in the sloped track two further tracks away. In this case, the amount of precedence of the rotary head 4A over the rotary head 6A is not exactly an integer times one field. For instance, the time difference between the time instant when the rotary head 4A traces the track Trk6 and the time instant when the rotary head 6A traces the same is not exactly an integer times one field. Accordingly, it is preferable that the switching pulse for the reproducing rotary head is different from that (track selecting pulse) for the recording rotary head, and the phase of one of the switching pulses with respect to the other is so adjusted that the positional shift of the track is corrected.

Figure 7:
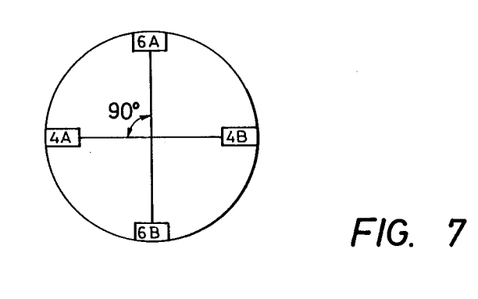
FIG. 7 is a plan view showing another example of the arrangement of the rotary heads in the device of the invention.

In the case where it is possible to record signals on the magnetic tape again, the erasing rotary heads 5 can be eliminated. In this case, the reproducing rotary heads 4A and 4B and the recording rotary heads 6A and 6B may be arranged at angular intervals of 90° with a predetermined amount of precedence as shown in FIG. 7 instead of being arranged on the straight lines in parallel with the rotary axis. In this case, the delay time given by the delay circuit 33 should be changed according to the amount of precedence.

As was described above, in the magnetic recording and reproducing device of the invention, the rotary heads are used to record digital signals on the tracks formed by dividing each sloped track and to reproduce the digital signals of the tracks. According to the invention, the recording rotary heads and the reproducing rotary heads are so arranged that the reproducing rotary heads precede the recording heads by at least three fields. A desired one of the plurality of tracks is selected. The digital signal of the tracks thus selected is reproduced with the reproducing rotary head, subjected to time axis expansion and outputted as an analog signal. A new analog signal is inputted in synchronization with the analog signal thus outputted, converted into digital signal, and subjected to time axis compression. The new digital signal thus inputted is recorded with the recording rotary head on a track including the track selected, in synchronization with a least a part of the digital signal recorded on the selected track. Therefore, the after-recording can be positively achieved in synchronization with the signal recorded on the predetermined track.

What is claimed is:

1. A magnetic recording and reproducing method for a device in which digital signals are recorded on a plurality of recording tracks obtained by dividing each of a plurality of sloped tracks on a tape and reproduced therefrom by rotary heads, comprising the steps of:
 rotating a rotary drum supporting a plurality N of reproducing rotary heads and a plurality N of recording rotary heads corresponding to said reproducing rotary heads;
 running a recording tape over said rotating rotary drum, whereby said rotary heads trace a plurality of sloped tracks on said tape;
 arranging each of said reproducing rotary heads on said rotary drum to precede a corresponding recording rotary head by at least three fields in passing over a given area of said running tape, a field being a time of rotation of said rotary drum by 360°/N;
 selecting a desired one of a plurality of recording tracks forming one of said sloped tracks;
 reproducing a first digital signal recorded in said selected recording tracks with one of said reproducing rotary heads;
 expanding in time and converting said reproduced digital signal to a first analog signal;
 outputting said first analog signal;
 inputting in synchronization with said outputting step a second analog signal;

converting said second analog signal to a second digital signal and compressing said second digital signal in time; and recording with one of said recording rotary heads corresponding to said one reproducing rotary head said compressed second digital signal on a recording track including said selected recording track in synchronization with recording at least a part of said first digital signal.

2. A method as recited in claim 1, therein said recording tracks are recorded with a first channel and a second channel and said first digital signal contains said first and second channels, further comprising the step of storing said first channel in a memory, and wherein said recording step records said second digital signal and said first channel on said recording track including and said selected recording track.

3. A magnetic recording and reproducing method for a device in which digital signals are recorded on a plurality of recording tracks obtained by dividing each of a plurality of sloped tracks on a tape and reproduced therefrom by rotary heads, comprising the steps of:

rotating a rotary drum supporting a plurality N of reproducing rotary heads and a plurality N of recording rotary heads corresponding to said reproducing rotary heads;

running a recording tape over said rotating rotary drum, whereby said rotary heads trace a plurality of sloped tracks on said tape;

arranging each of said reproducing rotary heads on said rotary drum to precede a corresponding recording rotary head by at least three fields in passing over a given area of said running tape, a field being a time of rotation of said rotary drum by 360°/N;

selecting a desired one of a plurality of recording tracks forming one of said sloped tracks;

reproducing a first digital signal recorded in said selected recording track with one of said reproducing rotary heads;

expanding said reproduced digital signal in time and delaying said reproduced digital signal by a predetermined period of time longer than a period of time said one reproducing head traces said selected recording track;

converting said expanded and delayed digital signal to a first analog signal;

outputing said first analog signal;

inputting in synchronization with said outputing step a second analog signal;

converting said second analog signal to a second digital signal and compressing said second digital signal in time; and recording with one of said recording rotary heads corresponding to said one reproducing rotary head said compressed second digital signal on a recording track including said selected recording track in synchronization with recording at least a part of said first digital signal.

4. A magnetic recording and reproducing device in which digital signals are recorded on a plurality of recording tracks obtained by dividing each of a plurality of sloped tracks on a tape and reproduced therefrom by rotary heads, comprising:

a rotating rotary drum supporting a plurality N of reproducing rotary heads and a plurality N of recording rotary heads corresponding to said reproducing rotary heads;

a recording tape running over said rotating rotary drum, whereby said rotary heads trace a plurality of sloped tracks on said tape;

each of said reproducing rotary heads being arranged on said rotary drum to precede a corresponding recording rotary head by at least three fields in passing over a given area of said running tape, a field being a time of rotation of said rotary drum rotary heads by 360°/N;

means for selecting a desired one of a plurality of recording tracks forming one of said sloped tracks;

means for reproducing a first digital signal recorded in said selected recording track with one of said reproducing rotary heads;

means for expanding in time and converting said reproduced digital signal to a first analog signal;

means for outputting said first analog signal;

means for inputting in synchronization with said outputting of said first analog signal a second analog signal;

means for converting said second analog signal to a second digital signal and compressing said second digital signal in time; and means for recording with one of said recording rotary heads corresponding to said one reproducing rotary head said compressed second digital signal on a recording track including said selected recording track in synchronization with recording at least a part of said first digital signal.

5. A device as recited in claim 4, wherein said recording tracks are recorded with a first channel and a second channel and said first digital signal contains said first and second channels, further comprising a memory for storing said first channel and wherein said recording means records said compressed second digital signal and said stored first channel on said recording track including said selected recording track.

6. A magnetic recording and reproducing device in which digital signals are recorded on a plurality of recording tracks obtained by dividing each of a plurality of sloped tracks on a tape and reproduced therefrom by rotary heads, comprising:

a rotating rotary drum supporting a plurality N of reproducing rotary heads and a plurality N of recording rotary heads corresponding to said reproducing rotary heads;

a recording tape running over said rotating rotary drum, whereby said rotary heads trace a plurality of sloped tracks on said tape;

each of said reproducing rotary heads being arranged on said rotary drum to precede a corresponding recording rotary head by at least three fields in passing over a given area of said running tape, a field being a time of rotation of said rotary drum rotary heads by 360°/N;

means for selecting a desired one of a plurality of recording tracks forming one of said sloped tracks;

means for reproducing a first digital signal recorded in said selected recording track with one of said reproducing rotary heads;

means for expanding in time and delaying said reproduced digital signal by a predetermined period of time longer than a period of time said one reproducing head traces said selected recording track;

means for converting said expanded and delayed digital signal to a first analog signal;

means for outputting said first analog signal;

means for inputting in synchronization with said outputting of said first analog signal a second analog signal;
means for converting said second analog signal to a second digital signal and compressing said second digital signal in time; and
means for recording with one of said recording rotary heads corresponding to said one reproducing rotary head said compressed second digital signal on a recording track including said selected recording track in synchronization with recording at least a part of said first digital signal.

* * * * *